US012660735B2

(12) United States Patent
Cappelleri et al.

(10) Patent No.: US 12,660,735 B2
(45) Date of Patent: Jun. 23, 2026

(54) AUTOMATED SYSTEMS AND METHODS FOR AGRICULTURAL CROP MONITORING AND SAMPLING

(71) Applicant: Purdue Research Foundation, West Lafayette, IN (US)

(72) Inventors: David J. Cappelleri, West Lafayette, IN (US); Nitya N. Agrawal, Centreville, VA (US); Aarya Deb, West Lafayette, IN (US); Brian Huang, Scotch Plains, NJ (US); Kitae Kim, West Lafayette, IN (US)

(73) Assignee: Purdue Research Foundation, West Lafayette, IN (US)

( * ) Notice: Subject to any disclaimer, the term of this patent is extended or adjusted under 35 U.S.C. 154(b) by 101 days.

(21) Appl. No.: 18/617,794

(22) Filed: Mar. 27, 2024

(65) Prior Publication Data
US 2024/0324485 A1 Oct. 3, 2024

Related U.S. Application Data

(60) Provisional application No. 63/456,095, filed on Mar. 31, 2023.

(51) Int. Cl.
*A01B 79/00* (2006.01)
*B25J 11/00* (2006.01)
(Continued)

(52) U.S. Cl.
CPC ......... *A01B 79/005* (2013.01); *B25J 11/0055* (2013.01); *B25J 15/0019* (2013.01);
(Continued)

(58) Field of Classification Search
CPC .............. A01B 79/005; G01C 21/1656; G01C 21/1652; B25J 11/0055; B25J 15/0019; G01S 17/89
(Continued)

(56) References Cited

U.S. PATENT DOCUMENTS

| | | | |
|---|---|---|---|
| 12,405,115 B2 * | 9/2025 | Yilmaz .............. | G01C 21/1656 |
| 2005/0126144 A1 * | 6/2005 | Koselka ................. | A01D 46/30 |
| | | | 56/10.2 R |

(Continued)

OTHER PUBLICATIONS

Mehta, S. S. et al., "Vision-based control of robotic manipulator for citrus harvesting." Computers and Electronics in Agriculture, 102, Jun. 2014, pp. 146-158.
(Continued)

*Primary Examiner* — Jessica Lemieux
(74) *Attorney, Agent, or Firm* — Purdue Research Foundation

(57) ABSTRACT
A robotic system navigates a terrain adjacent one or more agricultural crops. The system includes a movable body operable to navigate the ground terrain, a tracking camera configured to generate visual-inertial odometry (VIO) data, a first LiDAR sensor configured to capture a first set of LiDAR data, a second LiDAR sensor configured to capture a second set of LiDAR data, and a controller. The controller is configured to generate terrain navigation instructions utilizing a Monte Carlo Localization algorithm, wherein the Monte Carlo Localization algorithm includes the VIO data from the tracking camera and the first set of LiDAR data.

17 Claims, 12 Drawing Sheets

(51) Int. Cl.
    *B25J 15/00*       (2006.01)
    *G01C 21/16*       (2006.01)
    *G01S 17/89*       (2020.01)
(52) U.S. Cl.
    CPC ..... *G01C 21/1652* (2020.08); *G01C 21/1656*
                (2020.08); *G01S 17/89* (2013.01)
(58) Field of Classification Search
    USPC .......................................................... 701/50
    See application file for complete search history.

(56) References Cited

U.S. PATENT DOCUMENTS

| | | | |
|---|---|---|---|
| 2011/0137456 A1* | 6/2011 | Koselka | G05D 1/021 |
| | | | 701/532 |
| 2016/0205872 A1* | 7/2016 | Chan | G05D 1/0011 |
| 2021/0299692 A1* | 9/2021 | Van De Woestyne | |
| | | | A01C 15/04 |
| 2022/0066456 A1* | 3/2022 | Ebrahimi Afrouzi | |
| | | | G06F 3/04883 |
| 2022/0147053 A1* | 5/2022 | Lin | G01S 17/931 |
| 2022/0183208 A1* | 6/2022 | Sibley | G06V 20/56 |
| 2023/0172108 A1* | 6/2023 | Long | A01D 41/127 |
| | | | 56/10.2 R |
| 2025/0172942 A1* | 5/2025 | Ebrahimi Afrouzi | |
| | | | A47L 9/0477 |

OTHER PUBLICATIONS

Uppalapati, N. K. et al., "A berry picking robot with a hybrid soft-rigid arm: Design and task space control." Robotics: Science and Systems 2020, Corvalis, Oregon, USA, Jul. 12-16, 2020, 10 pgs.

Manish, R. et al., "Agbug: Agricultural robotic platform for in-row and under canopy crop monitoring and assessment." In the Proceedings of the ASME 2021 International Design Engineering Technical Conferences and Computers and Information in Engineering Conference, IDETC-CIE2021, Aug. 17-19, 2021, Virtual, Online, DETC2021-68143, pp. V08BT08A017-1-7.

Mahlein, A.-K., "Plant disease detection by imaging sensors—parallels and specific demands for precision agriculture and plant phenotyping." Plant Disease, vol. 100, No. 2, Feb. 2016, pp. 241-251; Published online Jan. 18, 2016. Available online at URL: https://apsjournals.apsnet.org/doi/full/10.1094/PDIS-03-15-0340-FE.

Mohanty, S. P. et al., "Using deep learning for image-based plant disease detection." Frontiers in Plant Science, Sep. 2016, vol. 7, Article 1419, pp. 1-10; Published Sep. 22, 2016. Available online at URL: https://www.frontiersin.org/articles/10.3389/fpls.2016.01419/full.

Liu, J. et al., "Plant diseases and pests detection based on deep learning: A review." Plant Methods, vol. 17, Article No. 22, 2021, pp. 1-18; published online Feb. 24, 2021. Available online at URL: https://plantmethods.biomedcentral.com/articles/10.1186/s13007-021-00722-9.

Fraiwan, M. et al., "Classification of corn diseases from leaf images using deep transfer learning." Plants, vol. 11, Article No. 2668, 2022, pp. 1-14; published Oct. 11, 2022. Available onine at URL: https://www.mdpi.com/2223-7747/11/20/2668.

Vrochidou, E. et al., "An overview of end effectors in agricultural robotic harvesting systems." Agriculture, vol. 12, Article No., 2022; pp. 1-35; published Aug. 17, 2022. Available online at URL: https://www.mdpi.com/2077-0472/12/8/1240.

Triki, A. et al., "Deep leaf: Mask R-CNN based leaf detection and segmentation from digitized herbarium specimen images." Pattern Recognition Letters, vol. 150, Jul. 2021, pp. 76-83.

Mueller-Sim, T. et al.: "The robotanist: A ground-based agricultural robot for high-throughput crop phenotyping." 2017 IEEE International Conference on Robotics and Automation (ICRA), Singapore, May 29-Jun. 3, 2017, pp. 3634-3639. Available online at URL: https://ieeexplore.ieee.org/document/7989418.

Abel, J., "In-field robotic leaf grasping and automated crop spectroscopy." Masters of Science in Robotics, The Robotics Institute, Carnegie Mellon University, Pittsburg, PA, USA, Aug. 2018.

Birrell, S. et al., "A field-tested robotic harvesting system for iceberg lettuce." Journal of Field Robotics, 2020, vol. 37, No. 2, pp. 225-245, Mar. 2020; first published Jul. 7, 2019. Available online at URL: https://onlinelibrary.wiley.com/doi/10.1002/rob.21888.

He, Kaiming et al.: "Mask R-CNN. 2017 IEEE International Conference on Computer Vision." 2017, pp. 2980-2988. Available online at URL: https://ieeexplore.ieee.org/document/8237584.

Danielczuk, M. et al., "Segmenting unknown 3D objects from real depth images using mask R-CNN trained on synthetic data." 2019 International Conference on Robotics and Automation (ICRA), Montreal, Canada, May 20-24, 2019, pp. 7283-7290.

Campbell, M. et al., "An integrated actuation-perception framework for robotic leaf retrieval: Detection, localization, and cutting." 2022 IEEE/RSJ International Conference on Intelligent Robots and Systems (IROS), Oct. 23-27, 2022, Kyoto, Japan, pp. 9210-9216. Available online at URL: https://ieeexplore.ieee.org/document/9981118.

Yuan, J. et al., "ROW-SLAM: Under-canopy cornfield semantic slam." 2022 IEEE International Conference on Robotics and Automation (ICRA), May 23-27, 2022, Philadelphia, PA, USA, pp. 2244-2250.

Shu, F. et al., "Slam in the field: An evaluation of monocular mapping and localization on challenging dynamic agricultural environment." 2021 IEEE Winter Conference on Applications of Computer Vision (WACV), pp. 1760-1770.

Shan, T. et al.: "LeGO-LOAM: Lightweight and ground-optimized lidar odometry and mapping on variable terrain." 2018 IEEE/RSJ International Conference on Intelligent Robots and Systems (IROS), Madrid, Spain, Oct. 1-5, 2018., pp. 4758-4765.

Shan, T. et al., "LIO-SAM: Tightly-coupled lidar inertial odometry via smoothing and mapping." 2020 IEEE/RSJ International Conference on Intelligent Robots and Systems (IROS), Oct. 25-29, 2020, Las Vegas, NV, USA (Virtual), pp. 5135-5142.

Xie, Q. et al., "Crop height estimation of corn from multi-year RADARSAT-2 polarimetric observables using machine learning." Remote Sens. 2021, vol. 13, 392; Published Jan. 23, 2021. Available online at URL: https://www.mdpi.com/2072-4292/13/3/392.

Chen, S. W. et al.: "SLOAM: Semantic lidar odometry and mapping for forest inventory." IEEE Robotics and Automation Letters, vol. 5, No. 2, Apr. 2020, pp. 612-619; date of publication Jan. 3, 2020.

Jin, S. et al.: "Stem-leaf segmentation and phenotypic trait extraction of individual maize using terrestrial lidar data." IEEE Transactions on Geoscience and Remote Sensing, vol. 57, No. 3, Mar. 2019, pp. 1336-1346; date of publication Sep. 19, 2018.

* cited by examiner

---

Figure 9:
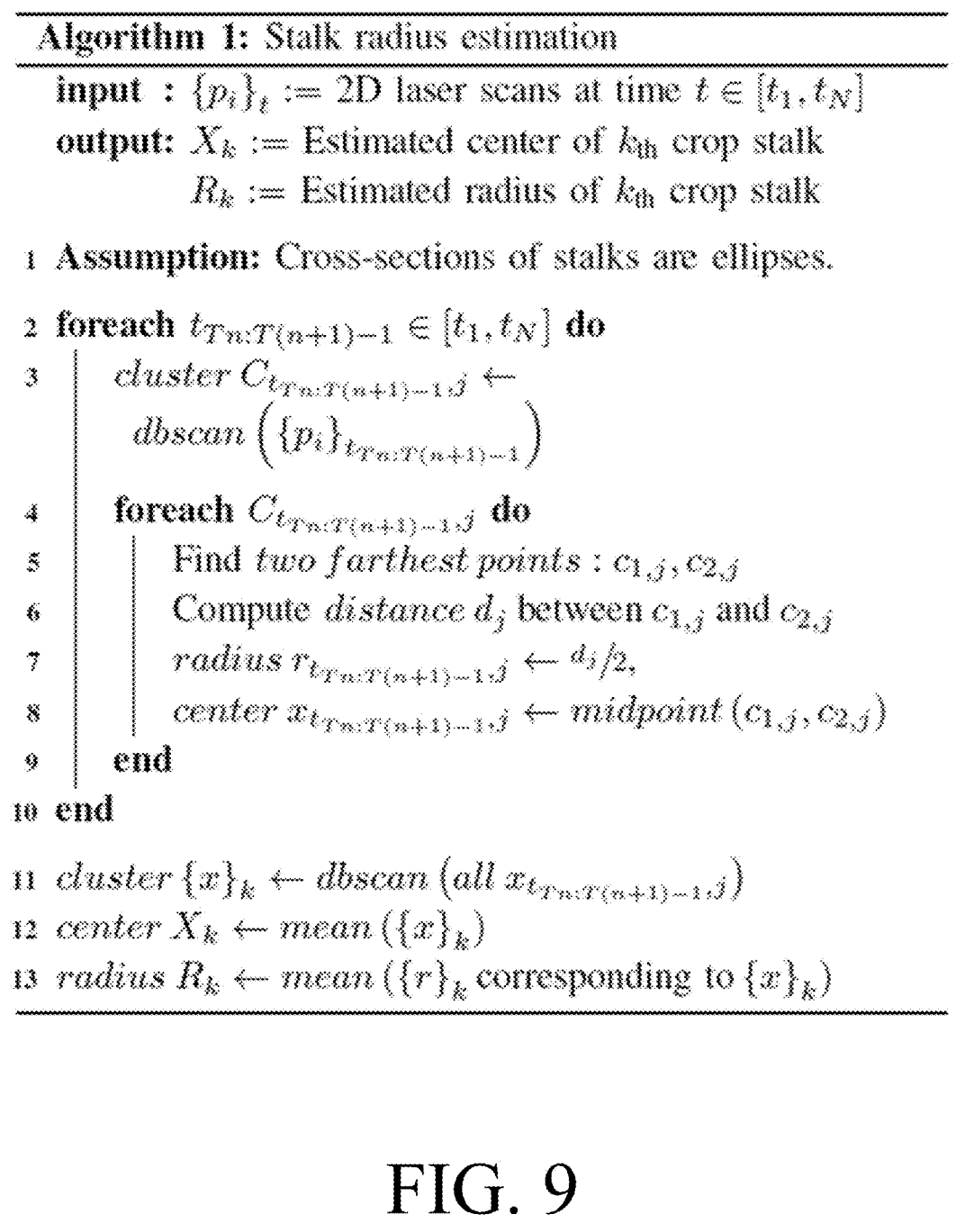

Algorithm 1: Stalk radius estimation

--- input : $\{p_i\}_t := $ 2D laser scans at time $t \in [t_1, t_N]$ output: $X_k := $ Estimated center of $k_{th}$ crop stalk $R_k := $ Estimated radius of $k_{th}$ crop stalk 1   Assumption: Cross-sections of stalks are ellipses.

2   foreach $t_{Tn:T(n+1)-1} \in [t_1, t_N]$ do

3       *cluster* $C_{t_{Tn:T(n+1)-1},j} \leftarrow$ $dbscan \left( \{p_i\}_{t_{Tn:T(n+1)-1}} \right)$ 4       foreach $C_{t_{Tn:T(n+1)-1},j}$ do

5            Find *two farthest points* : $c_{1,j}, c_{2,j}$

6            Compute *distance* $d_j$ between $c_{1,j}$ and $c_{2,j}$

7            *radius* $r_{t_{Tn:T(n+1)-1},j} \leftarrow d_j/2,$

8            *center* $x_{t_{Tn:T(n+1)-1},j} \leftarrow midpoint\,(c_{1,j}, c_{2,j})$ 9       end

10   end

11   *cluster* $\{x\}_k \leftarrow dbscan \left( all\ x_{t_{Tn:T(n+1)-1},j} \right)$ 12   *center* $X_k \leftarrow mean\,(\{x\}_k)$ 13   *radius* $R_k \leftarrow mean\,(\{r\}_k$ corresponding to $\{x\}_k)$

AUTOMATED SYSTEMS AND METHODS FOR AGRICULTURAL CROP MONITORING AND SAMPLING

CROSS-REFERENCE TO RELATED APPLICATIONS

This application is related to and claims the priority benefit of U.S. Provisional Patent Application No. 63/456,095, entitled "Automated Systems and Methods for Agricultural Crop Monitoring and Sampling," filed Mar. 31, 2023, the contents of which are hereby incorporated by reference in their entirety into the present disclosure.

GOVERNMENT SUPPORT CLAUSE

This invention was made with government support under Grant No. 1941529 awarded by the National Science Foundation. The government has certain rights in the invention.

TECHNICAL FIELD

The present application relates to robotics, and more particularly to automated robotic systems and methods for in-row and under-canopy crop monitoring and physical sampling.

BACKGROUND

This section introduces aspects that may help facilitate a better understanding of the disclosure. Accordingly, these statements are to be read in this light and are not to be understood as admissions about what is or is not prior art.

Precision agriculture uses technology to acquire and analyze data from farms to monitor the state of agricultural crops. Traditionally, crop monitoring and assessment has been accomplished through costly, labor-intensive, and time-consuming processes of crop scouting, manual sampling, and documenting the state of the farm. Recently, internet of things (IoT) technology and agricultural robotics have emerged as a viable approach to implement and create new precision agriculture practices. The data obtained from agricultural IoT sensors and autonomous vehicles can be used to predict and control the state of the farm efficiently. In addition, these automated measurement systems can assist farmers in managing crops and increasing crop production.

For crop monitoring, a variety of Unmanned Aerial Vehicles (UAVs) and Unmanned Ground Vehicles (UGVs) are currently utilized with autonomous navigation. UAVs and UGVs can perform well in environments where Global Navigation Satellite System (GNSS) signals are available. Map registration algorithms can be generated by using both UAVs and UGVs and correlating alignments with heterogeneous 3D maps. However, the relative displacements and rotations are provided by GNSS, so these technologies only tend to work in GNSS-friendly environments. Other high-precision control and corn stand counting algorithms have been created for an autonomous ground robot. However, those results were also shown to only work in environments with high GNSS capabilities.

When operating inside rows of crops and/or under the canopy of crops, GNSS signals are not reliable or non-existent. Therefore, for agricultural robots to operate in-row and under the canopy of crops, alternative platforms and approaches to estimate the vehicle pose and to precisely navigate are required. Additionally, in instances that require physically sampling crops within challenging or hard-to-reach areas, improved technology is needed.

SUMMARY

Aspects of this disclosure describe improved automated agricultural systems that are operable in areas where GNSS is inadequate or non-existent. Specifically, in some embodiments, a robotic system can be operable to navigate a terrain adjacent one or more agricultural crops. The system can include a movable body, a tracking camera, a first LiDAR sensor, a second, LiDAR sensor, and a controller. The movable body can be operable to navigate a ground terrain adjacent one or more agricultural crops. The tracking camera can be configured to generate visual-inertial odometry (VIO) data while the movable body navigates the ground terrain. The first and second LiDAR sensors can be configured to capture a first set and a second set of LiDAR data, respectively. The controller can be configured to generate terrain navigation instructions utilizing a Monte Carlo Localization algorithm, wherein the Monte Carlo Localization algorithm can include the VIO data from the tracking camera and the first set of LiDAR data. In some embodiments, the controller can be further configured to generate a crop monitoring dataset including at least one of a crop stalk height or a crop stalk radius using at least one of first LiDAR data from the first LiDAR sensor and the second LiDAR data from the second LiDAR sensor. In other embodiments, the controller can be configured to initiate a crop sampling procedure by selectively controlling a gripping member and an end effector. In that embodiment, the crop sampling procedure can include cutting and removing the portion from one or more of the agricultural crops.

In some embodiments, the RGB-D camera can be configured to provide vision-based guidance instructions to the robotic arm. The vision-based guidance instructions can include at least one of a position and a distance of the robotic arm related to the portion of the one or more of the agricultural crops during the crop sampling procedure.

In some embodiments, the Monte Carlo Localization algorithm of the controller incorporates an Extended Kalman Filter (EKF) to generate the terrain navigation instructions. The movable body can be coupled with a plurality of wheels configured to navigate the ground terrain, and the plurality of wheels can define a wheel odometry while the movable body navigates the ground terrain adjacent one or more agricultural crops, wherein the EKF is configured to combine the wheel odometry and the VIO data.

In some embodiments, generating a crop monitoring dataset can include initiating a neural network algorithm to detect a portion of one or more of the agricultural crops.

This summary is provided to introduce a selection of the concepts that are described in further detail in the detailed description and drawings contained herein. This summary is not intended to identify any primary or essential features of the claimed subject matter. Some or all of the described features may be present in the corresponding independent or dependent claims but should not be construed to be a limitation unless expressly recited in a particular claim. Each embodiment described herein does not necessarily address every object described herein, and each embodiment does not necessarily include each feature described. Other forms, embodiments, objects, advantages, benefits, features, and aspects of the present disclosure will become apparent to one of skill in the art from the detailed description and drawings contained herein. Moreover, the various apparatuses and methods described in this summary section, as well as elsewhere in this application, can be expressed as a large number of different combinations and subcombinations. All such useful, novel, and inventive combinations and subcombinations are contemplated herein, being recognized that the explicit expression of each of these combinations is unnecessary.

BRIEF DESCRIPTION OF THE DRAWINGS

While the specification concludes with claims which particularly point out and distinctly claim this technology, it is believed this technology will be better understood from the following description of certain examples taken in conjunction with the accompanying drawings, in which like reference numerals identify the same elements and in which:

(white point clouds) and stalk features $$\mathbb{F}_t^{c,i}$$

Figures 4A, 4B, 4C:
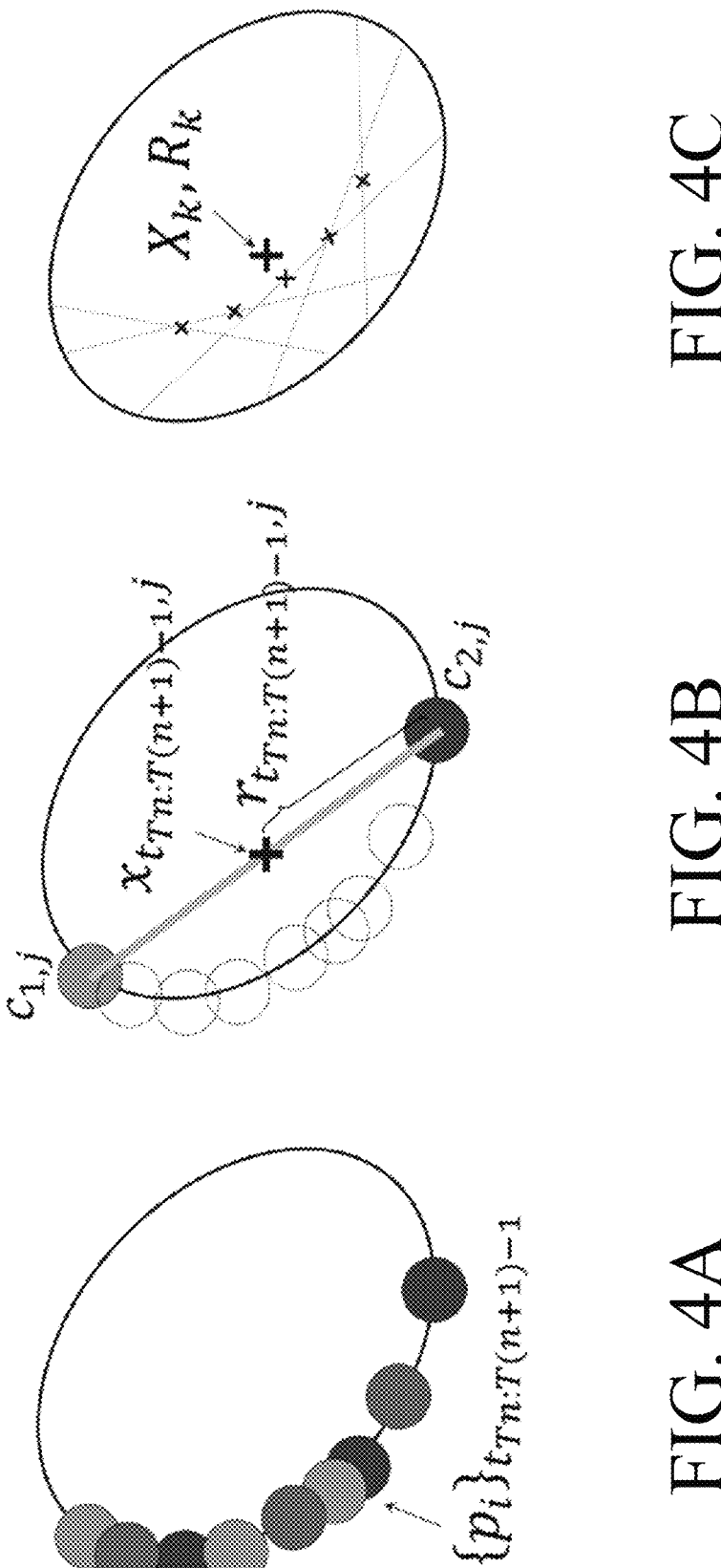
Figure 5B:
Figure 5A:
Figure 5D:
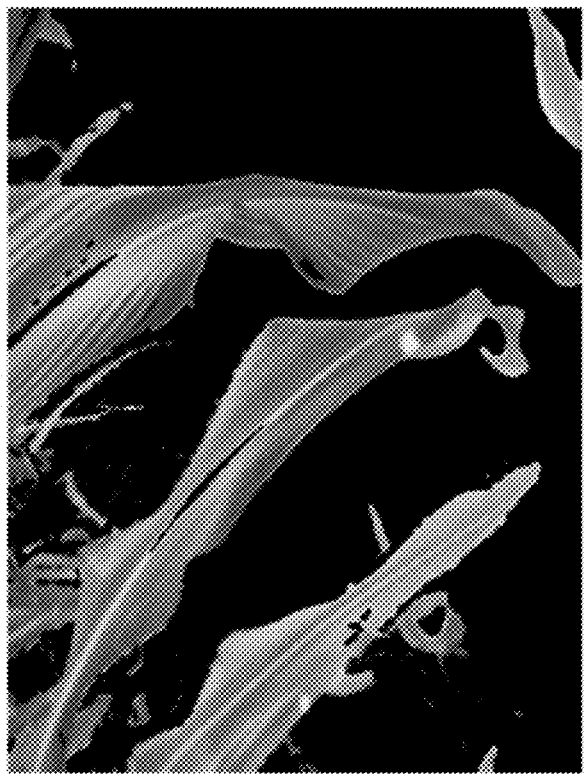
Figure 5C:
Figure 5F:
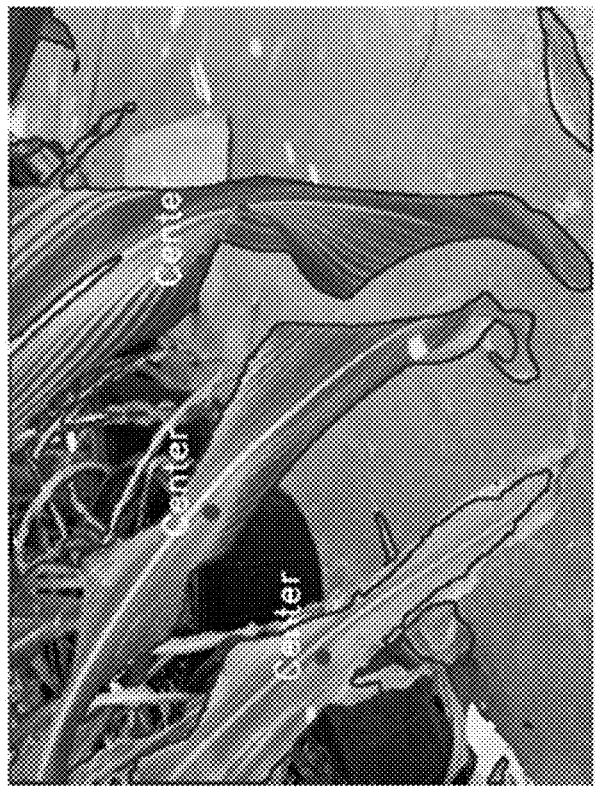
Figure 5E:
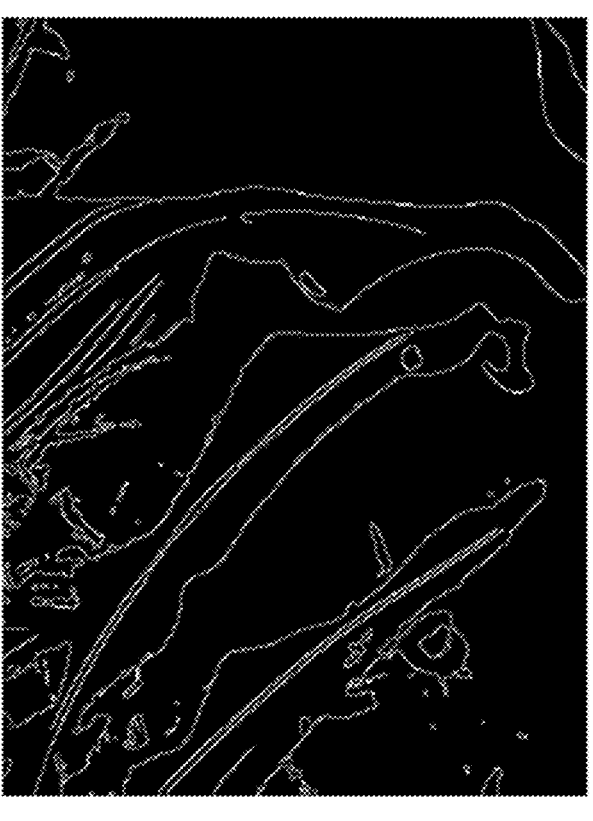
Figure 6:
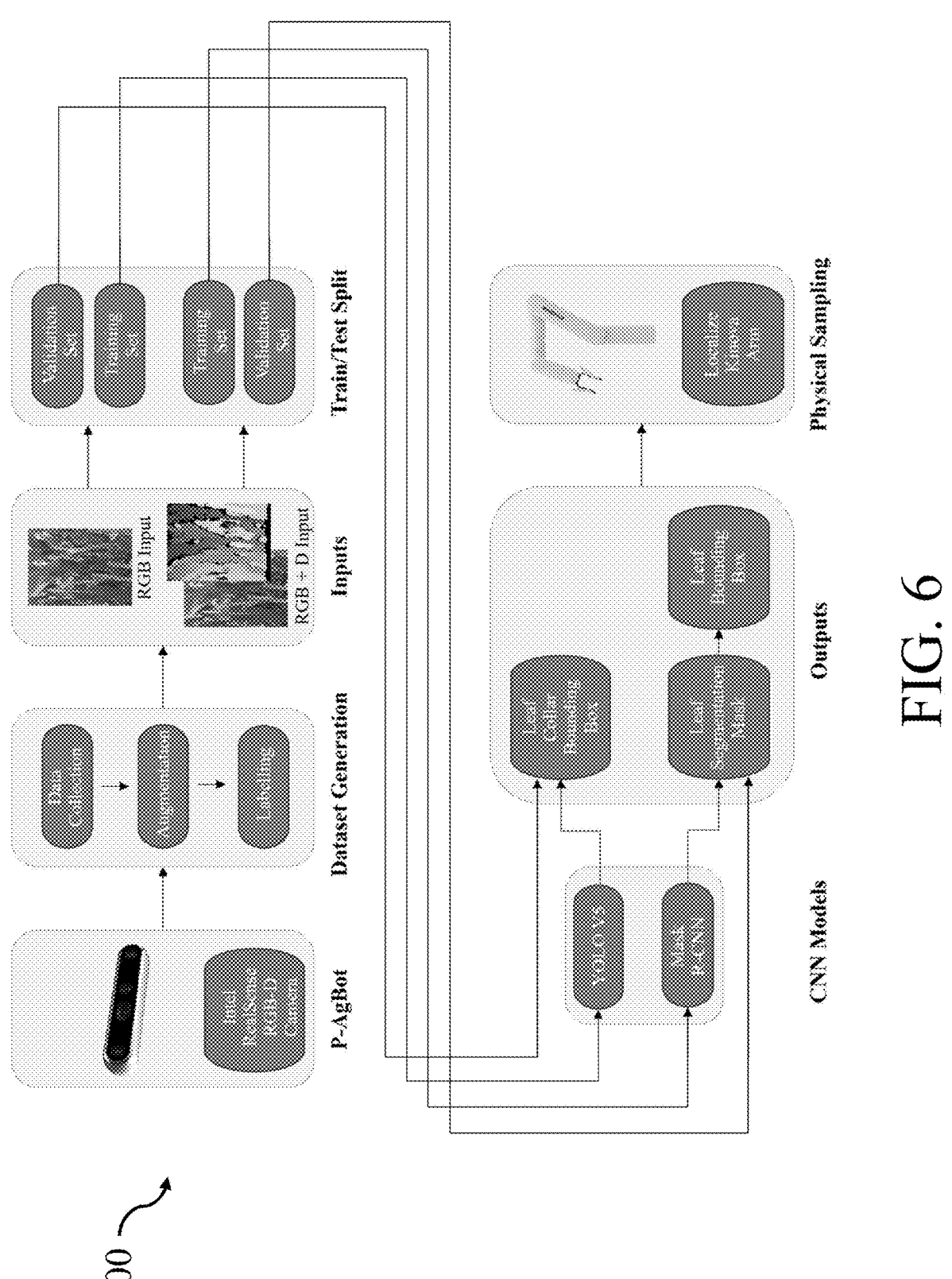
Figure 7B:
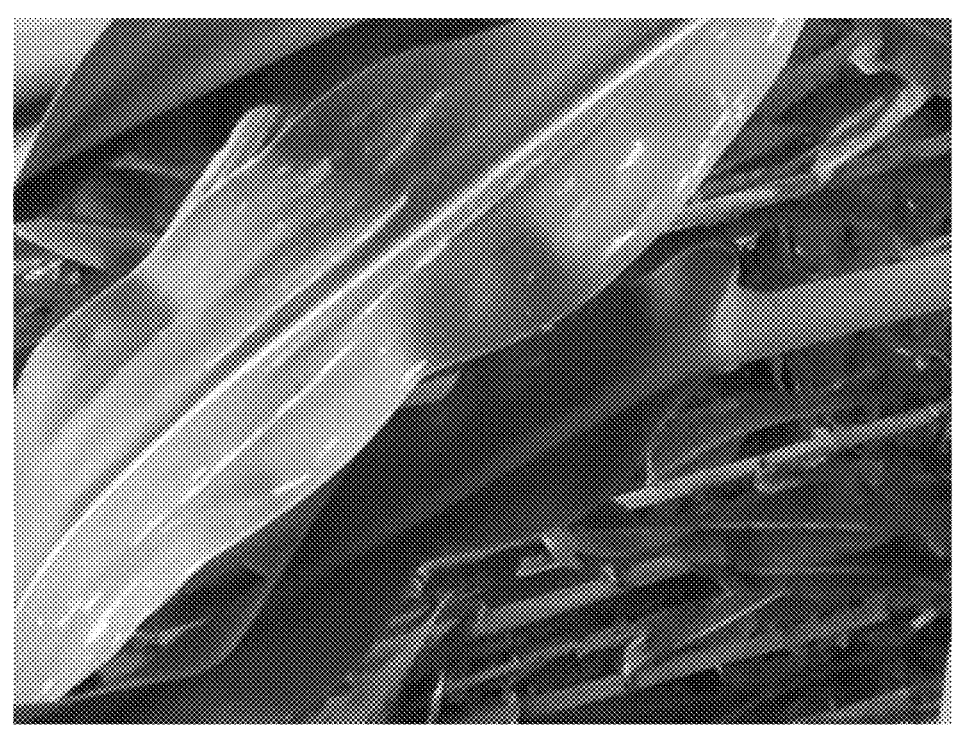
Figure 7A:
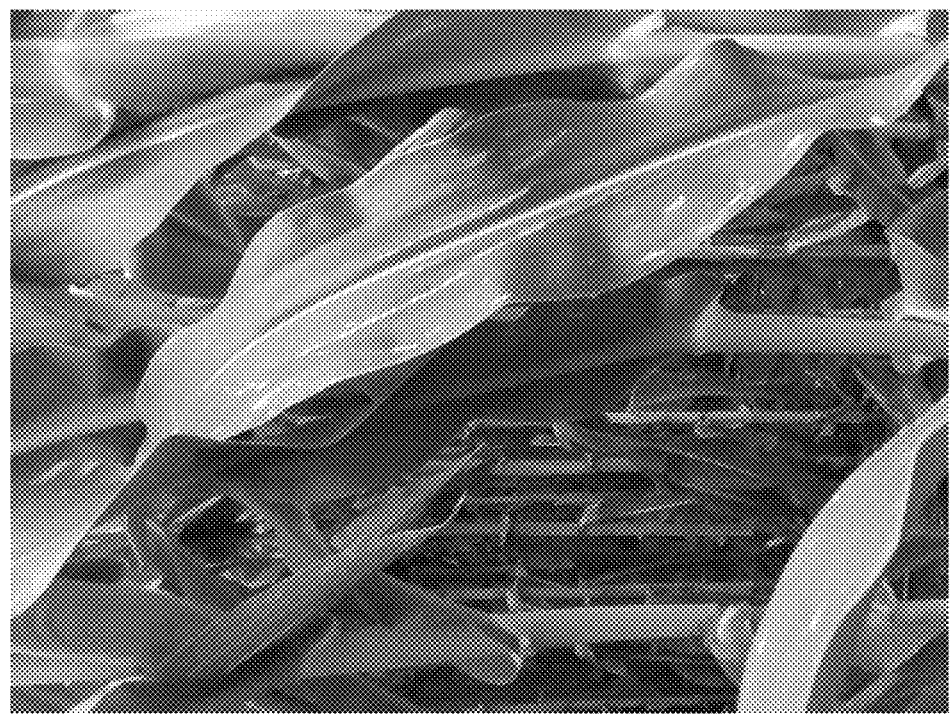
Figure 7D:
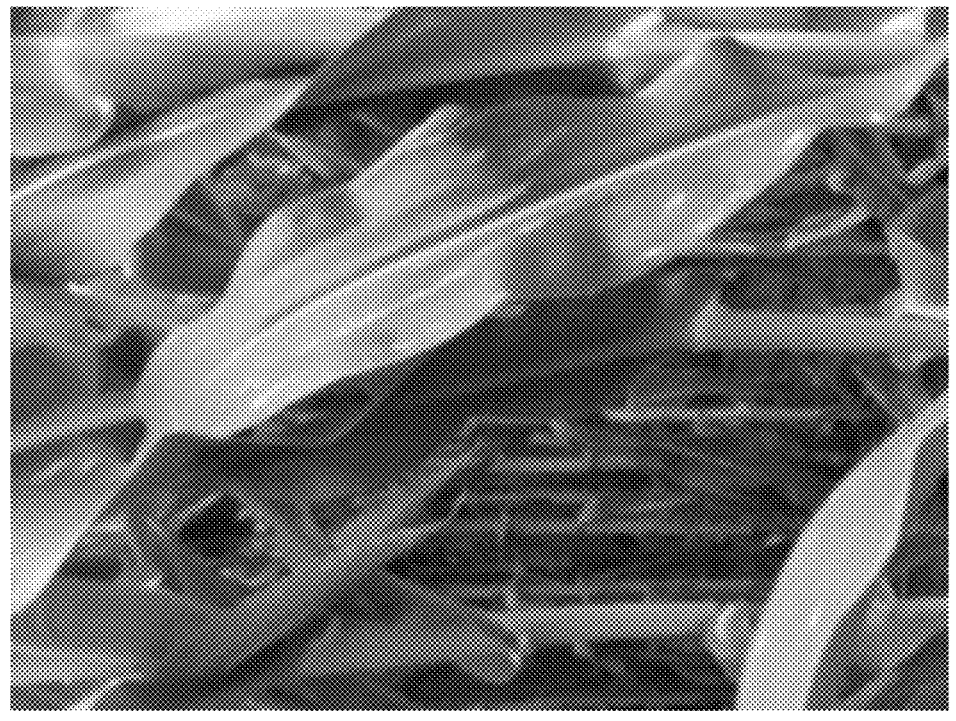
Figure 7C:
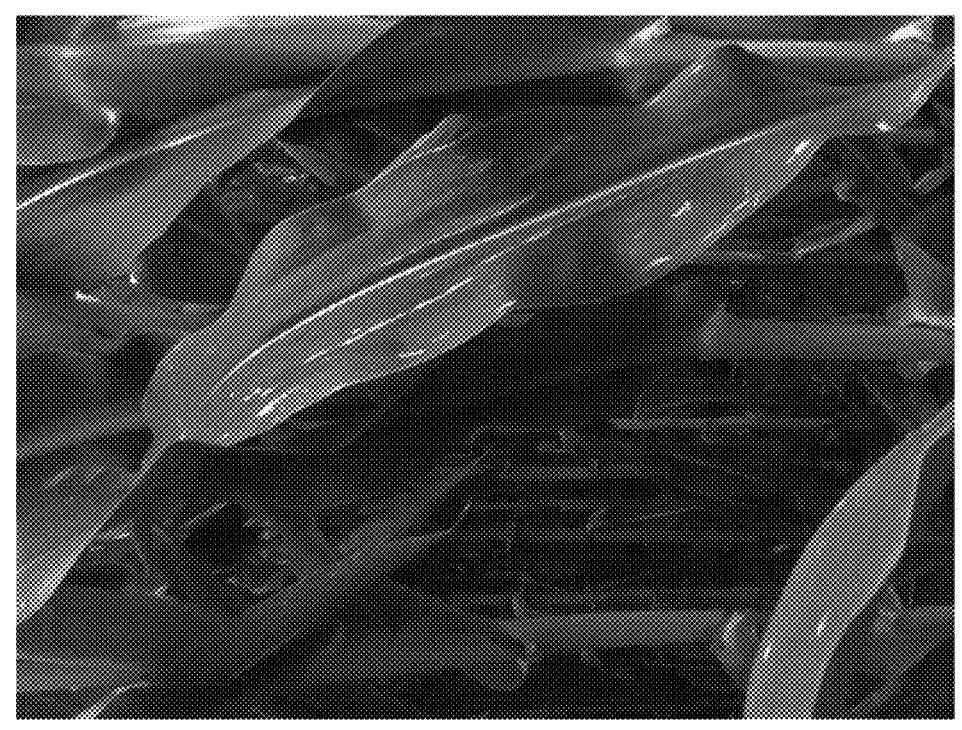
Figure 8:
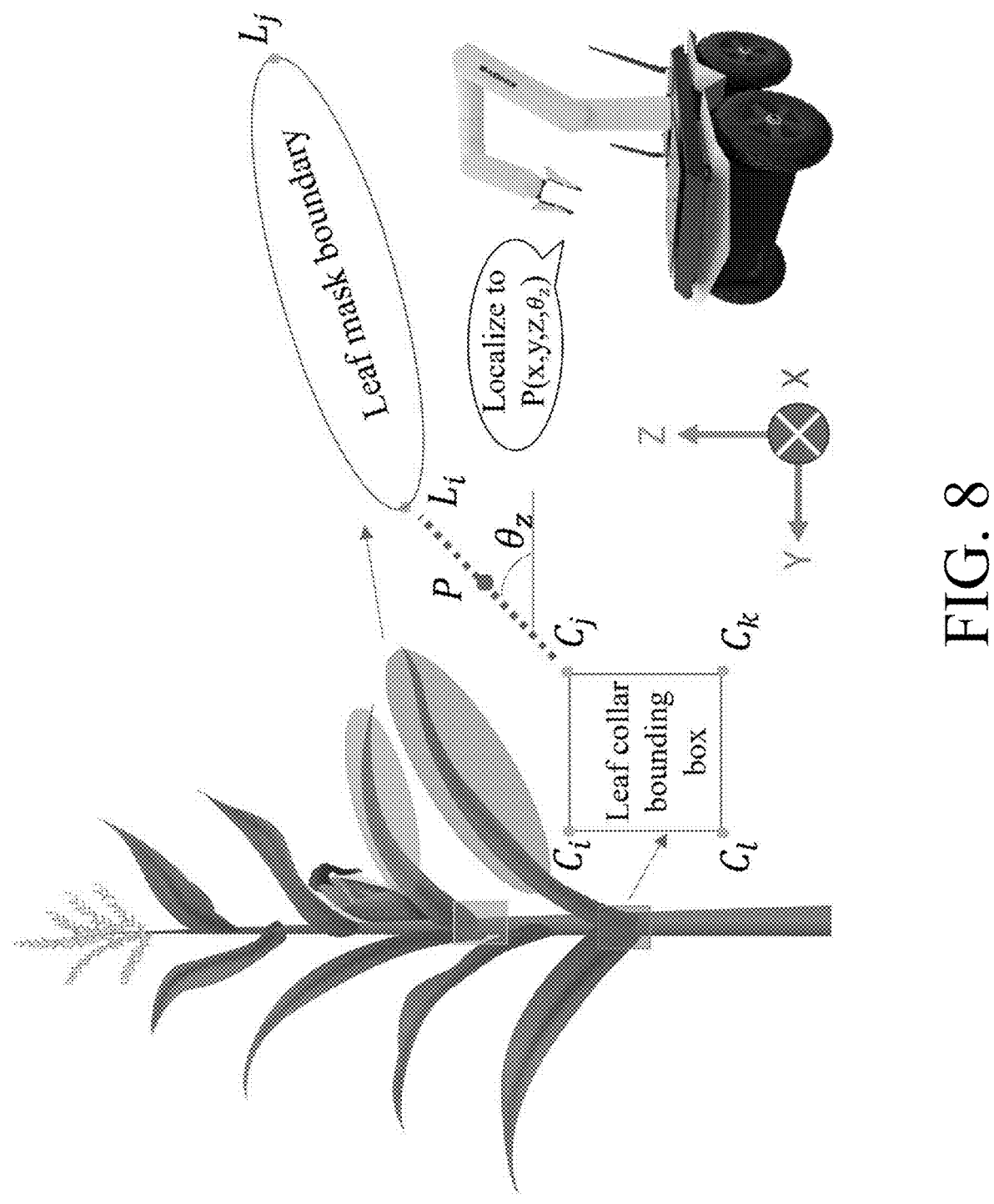

(linear lines);

FIG. 4A depicts a graphical representation of a stalk radius estimation, showing cluster laser scans ($p_i$) at periodic timestamps $t_{Tn:T(n+1)-1}$;

FIG. 4B depicts a graphical representation of a stalk radius estimation, showing the two farthest points fit to a major axis of an ellipse to estimate the radius and center point of the $j_{th}$ crop stalk;

FIG. 4C depicts a graphical representation of a stalk radius estimation, showing the final radius ($R_k$) and the center point ($X_k$) estimated based on the average of consecutive measurements;

FIG. 5A depicts a photographical representation of a first leaf detection algorithm stage;

FIG. 5B depicts a photographical representation of a second leaf detection algorithm stage;

FIG. 5C depicts a photographical representation of a third leaf detection algorithm stage;

FIG. 5D depicts a photographical representation of a fourth leaf detection algorithm stage;

FIG. 5E depicts a photographical representation of a fifth leaf detection algorithm stage;

FIG. 5F depicts a photographical representation of a sixth leaf detection algorithm stage;

FIG. 6 depicts a block diagram representation of an agricultural crop monitoring and sampling system framework operable for deep learning-based leaf detection, showing a dataset generation module, Mask R-CNN, and YOLOv5 training modules, and a physical sampling module;

FIG. 7A depicts a photographical representation of one stage of the dataset augmentation process, showing an original image;

FIG. 7B depicts a photographical representation of one stage of the dataset augmentation process, showing a cropped and rotated image;

FIG. 7C depicts a photographical representation of one stage of the dataset augmentation process, showing an underexposed image;

FIG. 7D depicts a photographical representation of one stage of the dataset augmentation process, showing a blurred image;

FIG. 8 depicts a schematic of one exemplary physical sampling algorithm and procedure; and FIG. 9 depicts a computer-implemented algorithm operable for estimating a crop stalk radius.

The drawings are not intended to be limiting in any way, and it is contemplated that various embodiments of the technology may be carried out in a variety of other ways, including those not necessarily depicted in the drawings. The accompanying drawings incorporated in and forming a part of the specification illustrate several aspects of the present technology, and together with the description serve to explain the principles of the technology; it being understood, however, that this technology is not limited to the precise arrangements shown, or the precise experimental arrangements used to arrive at the various graphical results shown in the drawings.

DETAILED DESCRIPTION

The following description of certain examples of the technology should not be used to limit its scope. Other examples, features, aspects, embodiments, and advantages of the technology will become apparent to those skilled in the art from the following description, which is by way of illustration, one of the best modes contemplated for carrying out the technology. As will be realized, the technology described herein is capable of other different and obvious aspects, all without departing from the technology. Accordingly, the drawings and descriptions should be regarded as illustrative in nature and not restrictive.

It is further understood that any one or more of the teachings, expressions, embodiments, examples, etc. described herein may be combined with any one or more of the other teachings, expressions, embodiments, examples, etc. that are described herein. The following-described teachings, expressions, embodiments, examples, etc. should therefore not be viewed in isolation relative to each other. Various suitable ways in which the teachings herein may be combined will be readily apparent to those of ordinary skill in the art in view of the teachings herein. Such modifications and variations are intended to be included within the scope of the claims.

I. OVERVIEW

The agricultural environment produces some unique challenges for autonomous robots. In the case of row-crops, farmers utilize narrow spacing between the rows (typically, from 18" to 30") in order to control weed spread and minimize the competition between plants for essential elements such as sunlight, water, and nutrients. However, this narrow spacing provides distinct geometric constraints for autonomous robots navigating between the crop rows. Once mature, crops can become very dense. For example, corn and sorghum can grow up to eight feet tall with their leaves creating a canopy that covers the most of, if not all the space between the rows. Consequently, GNSS receivers on autonomous agricultural robots navigating under the canopy in the crop rows are not able to collect reliable signals. Overhanging leaves, weeds, or downed crops provide obstacles that must be traversed or avoided. If physical samples of crops are required, the deployed sampling system on the robot must be versatile enough to perceive and sample the crops at various stages (heights) during the growing cycle.

Figure 1:
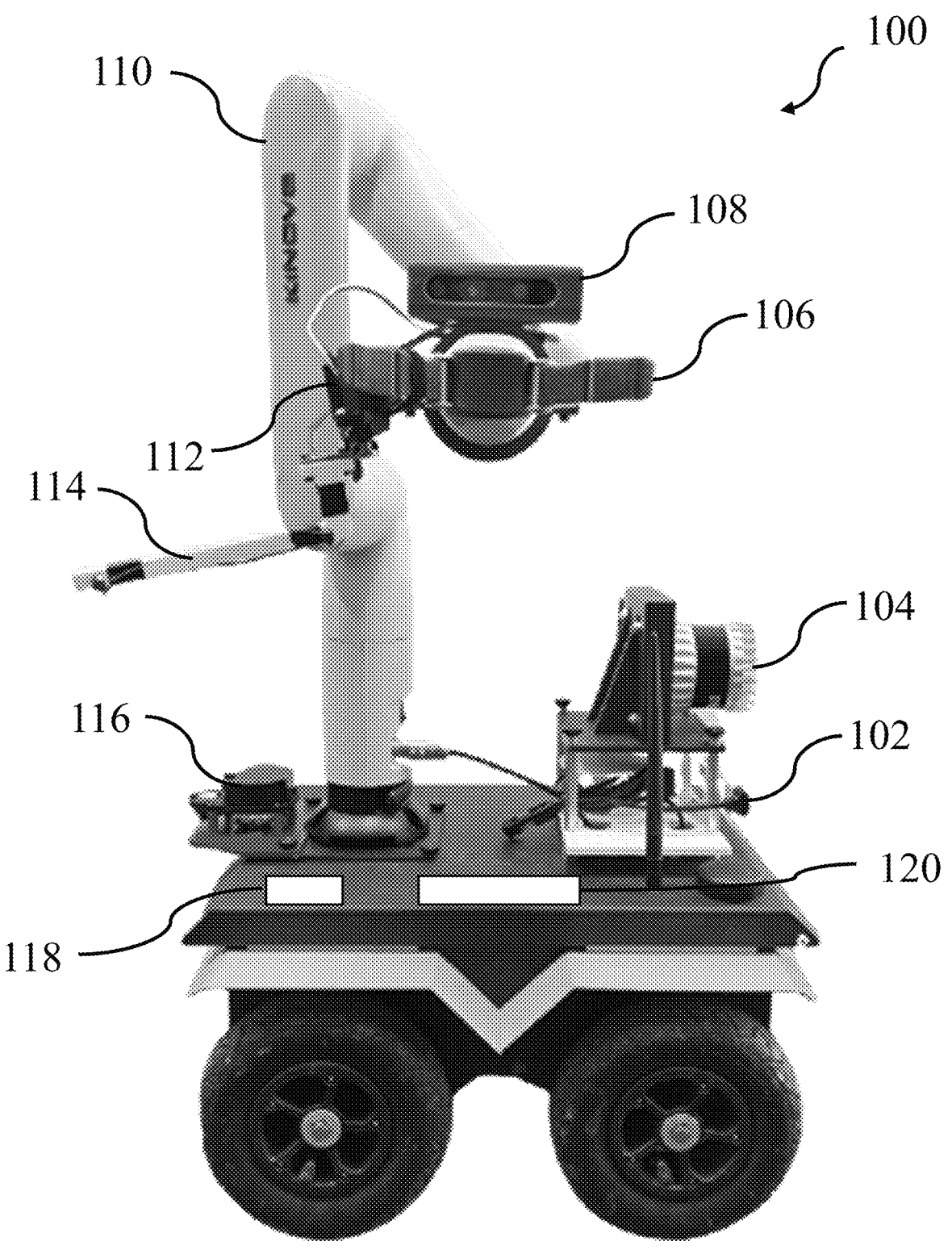
FIG. 1 depicts a schematic of one exemplary agricultural crop monitoring and sampling system.

To overcome the challenges described above, described herein are systems and methods pertaining to an improved automated agricultural robot (hereinafter referred to as the Purdue AgBot, or "P-AgBot") that is operable in areas where GNSS is inadequate or non-existent. Shown in FIG. 1 is one embodiment of P-AgBot (100), which is configured to operate in-row and under canopy for crop monitoring and physical sampling. While one embodiment of P-AgBot (100) is shown and described, it should be understood that other embodiments may include different combinations of the features described or may include other known features and functions that are deployed in prior art agricultural robots.

P-AgBot (100) is formed using a commercial Jackal unmanned ground vehicle platform, such as one from Clearpath Robotics Inc. of Kitchener, Ontario, Canada. P-AgBot (100) includes a weatherproof, all-terrain platform with a high torque 4×4 drivetrain for outdoor operations in rugged environments. More specifically, P-AgBot (100) includes a tracking camera (102), a 3D LiDAR sensor (104), a two-finger style gripper (106), an RGB-D camera (108), a robotic arm (110) configured for six degrees of freedom, a motor (112), a 3D printed linkage with nichrome wire end-effector (114), and a 2D or 3D LiDAR sensor (116). Additionally, P-AgBot (100) includes an onboard microcontroller (118) coupled with a CPU, for example, a Core i5 4570T manufactured by Intel Corp. of Santa Clara, CA, for motor control, data processing, and navigation. The LiDAR sensor (116) can be either 2D or 3D and mounted at the front or back of the P-AgBot (100) to provide localization and autonomous navigation. The 2D or 3D LiDAR sensor (116) can be, for example, an LDS-01 360 Laser Distance Sensor manufactured by ROBOTIS, Inc. of Lake Forest, CA or a VLP-16 sensor manufactured by Velodyne Lidar, Inc. of San Jose, CA. At the back of P-AgBot (100) is the tracking camera (102), which can be, for example, a RealSense T265 Tracking Camera manufactured by Intel Corp. of Santa Clara, CA. Also, at the back of the P-AgBot (100) is the 3D LiDAR sensor (104) which can be, for example, an OS1-64 LiDAR sensor manufactured by Ouster Inc. of San Francisco, CA. or a VLP-16 sensor manufactured by Velodyne Lidar, Inc. of San Jose, CA.

In operation, the tracking camera (102) is configured to publish visual-inertial odometry (VIO) at 200 Hz and the VIO tracks its own orientation and position in six degrees of freedom. The 3D LiDAR sensor (104) can be mounted vertically to capture the entirety of crops at various heights for mapping and capturing morphological measurements. For robot control and processing sensor data, the Robot Operating System (ROS) is utilized, which is stored on and operated by the CPU. P-AgBot (100) also has the integrated six degree-of-freedom robotic arm (110), which may be, for example, Gen3 Lite Robot manufactured by Kinova Inc. of Boisbriand, Quebec, Canada. The arm (110) is a lightweight manipulator capable of handling payloads up to 0.5 kg. It is powered directly through a 24V power supply of the Jackal with an average power consumption of 20W. The arm (110)

includes a 2-finger style gripper (106) with a servo-controlled nichrome wire end-effector attached to it. With a maximum reach of 1 m under full extension, the arm is operable to sample and manipulate crop leaves. The RGB-D camera (108) can be, for example, a RealSense D435 camera manufactured by Intel Corp. of Santa Clara, CA. The RGB-D camera (108) can be mounted to the end-effector link of the arm (110) to provide vision-based guidance to the arm (110) by detecting the position and distance of the desired leaf during the physical sampling process.

II. SYSTEMS AND METHODS FOR LOCALIZATION AND AUTONOMOUS NAVIGATION

Several components are needed for autonomous operation of P-AgBot (100) in between rows and under the canopy of crops. In terms of autonomous navigation, the robot needs to not only estimate its position precisely but also traverse to goal points without collision. GNSS-based localization methods are not applicable here due to large multipath errors resulting from unreliable (if any) signals when navigating under the crop canopy. Described below is an operation framework for localization and autonomous navigation in in-row and under-canopy agricultural environments. The framework system can estimate the robotic states and create a 3D point cloud map while P-AgBot (100) traverses under the canopy where GNSS signals are unreliable or nonexistent. With the 3D LiDAR pose correction module, the system can reduce the drift which is accumulated due to potential noisy wheel odometry and visual inertial odometry information.

The PAgBot (100) is equipped with a variety of sensors as shown in FIG. 1. The sensor configuration of P-AgBot (100) can be determined by considering the unique characteristics of cornfields. Cameras are generally inexpensive, lightweight, and provide images with diverse information. Because some plants (e.g., corn) consist of several leaves and ears, the amount of light that reaches under the canopy varies significantly depending on weather conditions and the positions of hanging leaves. In other words, the operational performance can become unstable under the canopies because the cameras are sensitive to illumination changes and occlusions caused by corn plants. Therefore, to achieve robustness in under-canopy environments, the described system combines datasets taken by both the tracking camera (102) and the 3D LiDAR (104), or alternatively the tracking camera (102) is replaced with a second 3D LiDAR. Although 3D LiDAR sensors can be expensive, they provide dense, accurate, and long-range data, and they are not as affected by illumination changes as other cameras. By using two sensors that have different feature advantages or that are operated to monitor different aspects, each sensor error can be corrected by the other sensor. The tracking camera (102) and 3D LiDAR sensor (104) are utilized to compute visual-inertial odometry (VIO) and LiDAR odometry, respectively. The tracking camera (102) can include two fisheye lens sensors, an Inertial Measurement Unit (IMU), and Vision Processing Units (VPUs) (e.g., a Movidius Myriad 2 manufactured by Intel, Corp. of Santa Clara, CA) which can internally compute and publish six degree-of-freedom (DOF) VIO at 200 Hz. As such, the VIO published from the tracking camera can be used along with the LiDAR data.

On average, typical corn plants are about 250 cm tall and 3D LiDAR sensors have a limited vertical field of view. Therefore, it can be more efficient to mount the 3D LiDAR sensor (104) vertically versus horizontally to measure and monitor the entire morphological appearance of each plant at once in the cluttered fields. Several state-of-the-art LiDAR odometry and mapping methods extract environmental features from a set of continuous series of scan points to estimate 6 DOF poses. However, these approaches are not suitable for pose estimation in cornfields since cornfields present more limited or repetitive features compared to structured urban environments. Therefore, an improved pose estimation approach is described below that is optimized for the unique properties of agricultural fields such as cornfields.

A. Feature Extraction

Figure 2:
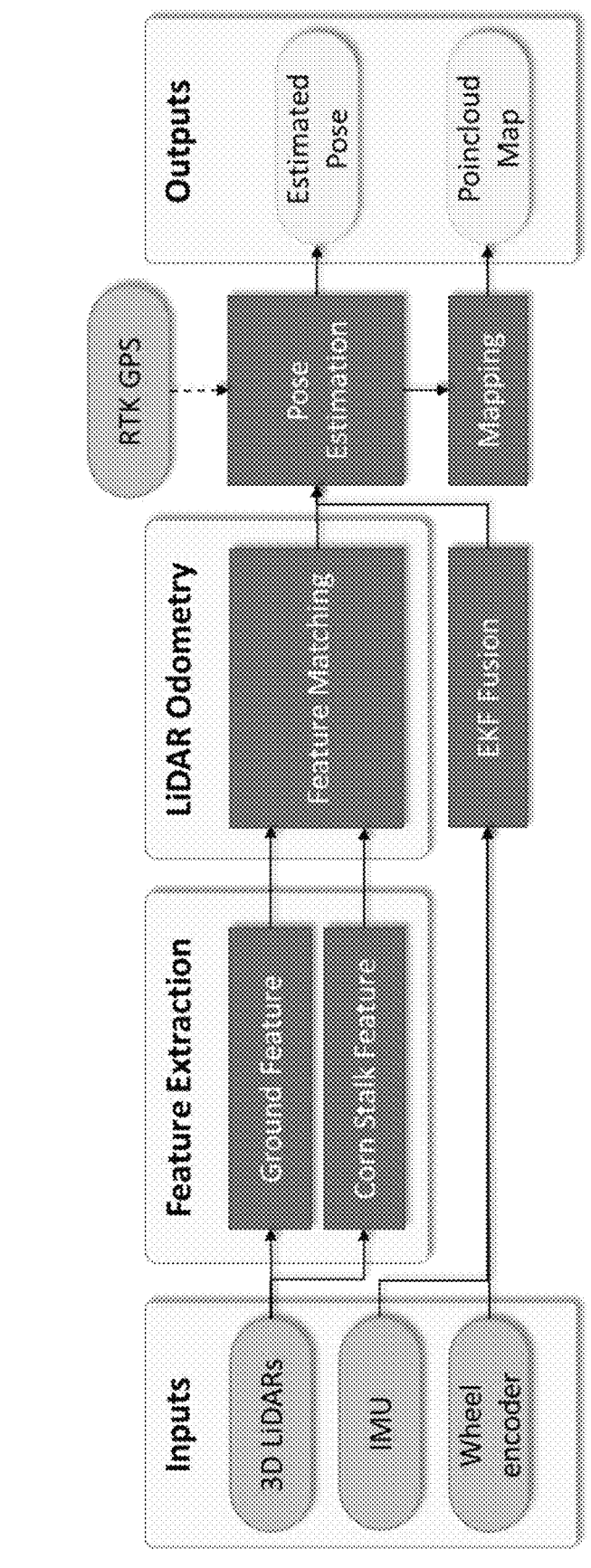
FIG. 2 depicts a block diagram representation of an agricultural crop monitoring and sampling system framework operable for simultaneous localization and mapping.

One example operational system framework (200) is shown in FIG. 2. The system framework (200) may be controlled by the microcontroller (118) to use three kinds of sensor data: 3D point cloud, VIO, and wheel odometry (WO). Each data is published by the 3D LiDAR sensor (104), tracking camera (102), and wheel encoders on P-Ag-Bot (100), respectively. The overall system framework (200) is divided into two modules: feature extraction and pose estimation. With the features extracted from the first module, the pose estimation module corrects the initial guess poses and a 3D point cloud map is generated. The details of these two modules are described in greater detail below. The 3D LiDAR sensor (104) expresses the surrounding environments with 3D point clouds and the point clouds are processed for feature extraction. As the first step, the original point clouds are down sampled by a filter (e.g., a VoxelGrid filter) through the Point Cloud Library (PCL) which improves the computational efficiency of the system. We define $P_t = \{p_1, p_2, \ldots, p_n\}$ as the down-sampled point cloud which is collected at time 1. $P_t$ is segmented into the ground points $$\mathbb{P}_t^{*g}$$

and the rest of the points $\overline{P}_t$ to improve the accuracy of corn stalk feature extraction. Since crop fields are generally located in flat terrains, it is reasonable to assume that the ground is flat. In addition, the number of laser scans reflected from the ground plane is relatively larger than the number of scans from individual crop plants. For these environmental characteristics, the Random Sampling and Consensus (RANSAC) algorithm is applied for ground points segmentation. The RANSAC algorithm, one of the most robust model fitting algorithms, computes the parameters for the ground plane estimation which maximize the number of inliers. The points which are segmented by RANSAC may not be used for the crop stalk feature extraction.

Unlike indoor or structured outdoor environments, such as warehouses or urban areas, corn plants do not have obvious distinguishable geometric features such as edges, corners, or planes which are usually used for odometry and mapping computation. Therefore, the unique morphological characteristics of corn plants can be considered when configuring the framework for cornfield operation. Corn plants grow with a single stalk with multiple leaves and corn ears are hung on the stalk. The single corn stalk is thin and, in some fields of view, the stalks are occluded by hanging leaves. Due to these morphological traits, it is difficult to guarantee a certain number of reflected scans from each height level of an individual corn stalk will be captured when the P-AgBot (100) drives between rows. Others have proposed a tree feature extraction method in forests. However, while trees and corn plants share some morphological similarities, they have a critical difference. Even though both trees and corn plants have a single trunk and stalk, trees do not have any hanging leaves around the trunk and this characteristic enables to the collection of clear shapes of tree trunks. This difference between the two objects makes it difficult to apply existing methods to cornfields.

Extracting corn stalk features consists of two processes: individual corn plant segmentation and stalk feature parameterization. $\overline{P}_t$ are separated into multiple segments which correspond to each corn plant, and stalk features are extracted from these segments. In the first step, the distribution of point clouds which are reflected in plants is considered. In terms of the overall distribution of point clouds, the number of points reflected from the stem is much larger than that of other positions such as leaves or ears. In other words, when $\overline{P}_t$ are projected into the plane parallel to the ground, the density of point clouds is higher in the stem positions than in any other positions. Therefore, the corn segmentation process projects $\overline{P}_t$ into the parallel plane to the ground and uses a density-based segmentation approach. It uses a density-based spatial clustering of applications with noise (DBSCAN) technique, one of the most popular clustering methods. DBSCAN clusters the point clouds into individual stalks distinguishing each stalk from the outputs from DBSCAN. A set of clustered point clouds of the corn plants is notated with an index i at time t as $$\overline{P}_t^i.$$

Figure 3B:
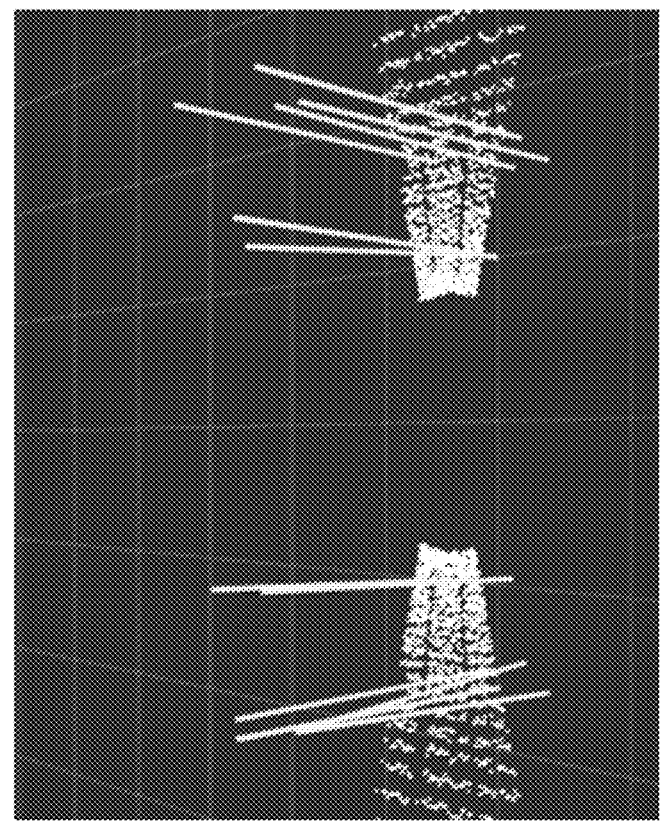
FIG. 3B depicts a visualization of point clouds before feature extraction and extracted features, showing ground plane point clouds $$\mathbb{F}_t^g$$
Figure 3B:
Figure 3A:
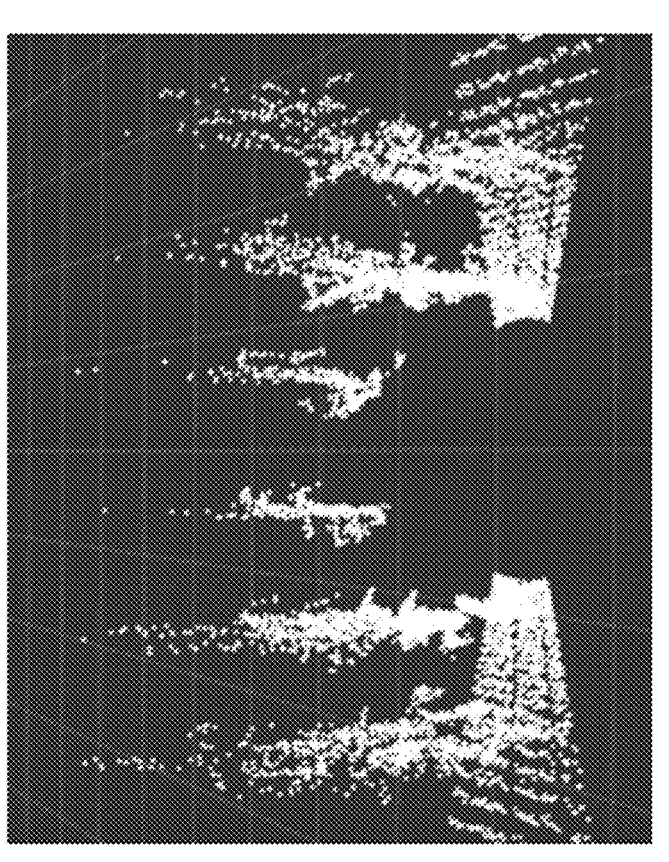
FIG. 3A depicts a visualization of point clouds before feature extraction and extracted features, showing downsampled point clouds $P_t$ before extracting features.

To estimate the robot poses by using the relative transformations of corn stalk models between consecutive timestamps, corn stalks are modeled as 3D straight lines in the local coordinate system. Stalk models are parameterized by a median normalized-vector growth (MNVG) algorithm. The MNVG algorithm conducts stem and leaf segmentation of the scanned individual corn plants by 3D LiDAR and searches the representative points of each corn stem. Since $$\overline{P}_t^i$$

is clustered based on the density, $$\overline{P}_t^i$$

includes outliers which are not scanned from stems. Therefore, the representative point identification by MNVG improves the 3D line modeling accuracy. The MNVG algorithm generates a beginning seed point using the L1-median method with the bottom points of each corn plant. Based on the beginning seed point, the growth direction of each corn plant is calculated by using median normalized vectors, and the next growing seed points are searched. These steps proceed recursively until the last searched seed point becomes unavailable to search for the growth direction anymore.

$$P_t^i = \{p_1, p_2 \ldots, p_n\}$$

is defined as a set of seed points of the $k^{th}$ corn plant at time t, and it is used for corn plant modeling. The system framework utilizes a singular value decomposition (SVD) for solving a line fitting problem which is a 3D Orthogonal Distance Regression (ODR) problem. ODR is a mathematical procedure of finding the best fitting line to a given set of points by minimizing their squared orthogonal distances to it. The representative line model of the $k^{th}$ corn plant is parameterized at time t by $$\mathbb{F}_t^{c,i} = (r_0, v),$$

where $r_0$ is a mean position value of $$P_t^i$$

and v is the direction vector of the line. A visualization of point clouds before feature extraction and extracted features is shown in FIGS. 3A and 3B, respectively. After the process, only $$\mathbb{F}_t^g \text{ and } \mathbb{F}_t^{c,i}$$

(see, FIG. 3B) are preserved.

B. State Estimation and Mapping Systems and Methods i. Odometry and LiDAR Pose Correction

While P-AgBot (100) drives between rows in the cornfields, an Extended Kalman Filter (EKF) fuses the measurements from WO and VIO, and it publishes $\overline{R}_t$ which indicates a six-DOF robot pose at time t (position: $t_x, t_y, t_z$, and orientation: $\theta_{roll}, \theta_{pitch}, \theta_{yaw}$). EKF fusion with two kinds of odometry information improves motion prediction. Even though EKF fusion enhances the performance of the motion prediction, there are a variety of environmental challenges for the robot localization only with WO and VIO in rows and under the canopies in the cornfields. Under the canopies, the amount of illumination is uneven as the wind blows and it decreases VIO accuracy and causes large VIO drifts. Thus, EKF poses are not suitable to use for long intervals. On the other hand, EKF poses in a short time interval are still reliable and robust. For these reasons, the framework system (200) utilizes $\overline{R}_t$ to understand the relative transformations between poses in consecutive timestamps, and an initial EKF pose $\overline{R}_0$ is set to an initial robot pose in a global map frame. To correct EKF pose drifts, a LiDAR-based pose correction module may be configured. As $\overline{T}_{t-1,t}$ an SE (3) transformation between consecutive EKF poses $\overline{R}_{t-1}$ and $\overline{R}_t$, $\overline{T}_{t-1,t}$ has a mathematical relationship, as expressed:

$$(\overline{T}_{t-1,t}) = (\overline{R}_{t-1})^{-1} \cdot \overline{R}_t. \qquad \text{("Eq. 1")}$$

The corrected pose at time t from $\overline{R}_t$ is defined as $R_t$. $T_{t-1,t}$ is used for an initial guess of the relative motion between two consecutive corrected poses $R_{t-1}$ and $R_t$. One can find the best feature match of $$\mathbb{F}_t^g \text{ and } \mathbb{F}_t^{c,i}$$

(separately which are extracted from LiDAR scans. The feature matching has an objective to correct the poses from $\overline{R}_t$ to $R_t$ by computing the best transformation which minimizes the Euclidean distance difference between time t−1 and t. In order to perform the feature matching, the framework system (200) utilizes the Iterative Closest Point (ICP) algorithm which outputs the transformation information that minimizes the difference between two point clouds. The ICP algorithm deals with two kinds of point cloud input data: the reference point clouds, and source point clouds. The reference points are kept fixed and source points are transformed to best match the reference. In this method, features at time t−1 and/are defined as the references and the sources, respectively. Point-to-point distances are calculated, and point correspondences are found between the references and sources in a global reference frame. Point clouds in $$\mathbb{F}_{t-1}^g \text{ and } \mathbb{F}_t^g$$

are directly applied to this procedure without any additional processing.

In the case of $$\mathbb{F}_t^{c,i},$$

before calculating the 3D point-to-point Euclidean distances in the ICP algorithm, the line feature correspondences are found to identify the same stalk in two different local robot frames, $\overline{R}_{t-1}$ and $\overline{R}_t$. Next, $r_0$ and v of each $$\mathbb{F}_{t-1}^{c,i}$$

is compared with $$\mathbb{F}_t^{c,i},$$

and the geometric similarities are measured to find the feature correspondences. The differences are computed in both the direction of v and the Euclidean distance between the projected $r_0$ to the ground plane for examining the similarity existence. After the stalk feature correspondences are found for each reference feature $$\mathbb{F}_{t-1}^{c,i},$$

the system uses the seed points $$P_t^i,$$

US 12,660,735 B2 which are the base components of $$\mathbb{F}_t^{c,i},$$

for the 3D point-to-point euclidean distance calculation in the global reference frame by the ICP algorithm. The ICP algorithm outputs the transformation, the combination of translation and rotation, for an Euclidean distance error metric minimization and it revises the transformation iteratively until the output satisfies the criteria for stopping the iterations.

The transformation for pose correction is composed of two kinds of ICP algorithm outputs from $$\mathbb{F}_t^g \text{ and } \mathbb{F}_t^{c,i}.$$

The framework system (200) relies on different motion constraint components from $$\mathbb{F}_t^g \text{ and } \mathbb{F}_t^{c,i}$$

to cover their different and unique geometric characteristics. It may be assumed that the normal direction of the ground plane, which is opposite to the gravitational force, represents the positive Z direction in the global reference frame. Throughout the ICP result from $$\mathbb{F}_t^g,$$

Z, roll, and pitch constraints have high reliability. X, Y, and yaw motions are not accurate to estimate due to their planar traits. Therefore, the ground model provides a SE(3) transformation $$T_{t-1,t}^{l,g},$$

which includes one translational (Z) and two rotational (roll, pitch) motions. X, Y, and yaw motions are constrained with the ICP result from $$\mathbb{F}_t^{c,i}.$$

Features in $$\mathbb{F}_t^{c,i}$$

exist effectively to constrain and correct poses in X, Y, and yaw directions because of the morphological characteristics of plants in cornfields. Therefore, the system obtains the other SE(3) transformation $$T_{t-1,t}^{l,c}$$

12 from $$\mathbb{F}_t^{c,i}$$

with 3-DOF which takes into account two translational (X, Y) and one rotation (yaw) motion. The transformation for pose correction $$T_{t-1,t}^{l}$$

is given by an equation, which is expressed as:

$$T_{t-1,t}^{l} = T_{t-1,t}^{l,g} \cdot T_{t-1,t}^{l,c}. \quad \text{(“Eq. 2”)}$$

The framework system (200) computes the transformations differently depending on the feature extraction results. A user can control a threshold in the system, the minimum number of the required corn stalks $N_{c,min}$. Depending on the threshold value, the system determines whether it applies the ICP algorithm to compute $$T_{t-1,t}^{l,c}$$

or not. If the number of extracted corn stalk features is less than Nc,min, the system diagnoses that the number of line features is too small to estimate the pose by $$\mathbb{F}_t^{c,i},$$

and sets $$T_{t-1,t}^{l,c}$$

as I, where I presents the identity transformation matrix. If the ground plane $$\mathbb{F}_t^g$$

is not extracted, the system sets $$T_{t-1,t}^{l,g}$$

as I due to the same reason as the previous case. Finally, the robot pose is corrected by the combination of $\overline{T}_{t-1,t}$ and $$T_{t-1,t}^{l}.$$

The mathematical expression of the current robot pose $R_t$ is shown as:

$$R_t = R_{t-1} \cdot \bar{T}_{t-1,t} \cdot T'_{t-1,t}. \qquad \text{("Eq. 3")}$$

ii. Mapping

The framework system (200) can build a 3D point cloud map $\mathcal{M}$, given a robot pose trajectory which is a series of $R_t$. In terms of mapping, the dense resolution of the map is required. This is because the objectives of the mapping in this system are to monitor and diagnose the status of the agricultural environments of interest. Therefore, to achieve the mapping objectives, the extracted features which have the reduced point cloud resolution may not be used, but instead the down-sampled point clouds $P_t$. $P_t$ are originally associated with the initial guess poses $\bar{R}_t$. Since the relative transformation between the base of the robot platform and the 3D LiDAR sensor (104) is fixed, $P_t$ can be associated into $R_t$. Consequently, $P_t$ with the local reference frame of $R_t$ are projected into the global map reference frame. In other words, the mapping performance relies on the pose estimation performance. As the robot trajectory is updated, the 3D point clouds are updated in $\mathcal{M}$ as well. Since the 3D LiDAR sensor (104) has a long scan range, corn plants in several rows on either side of the robot can be mapped on $\mathcal{M}$ when driving through one particular row.

III. SYSTEMS AND METHODS FOR CROP MONITORING

Manually obtained morphological measurements are routinely used to assess the status and health of crops throughout the growing season as well as in plant phenotyping studies. Thus, it may be desirable for the P-AgBot (100) to be able to autonomously capture these types of measurements as it traverses the field. Here, new schemes describe monitoring two kinds of indicators, the crop height and the stalk radius, to assist in crop monitoring studies.

A. Crop Height Monitoring

The vertically mounted 3D LiDAR sensor (104) on P-AgBot (100) can be used to estimate crop height. When the robot is traversing under cluttered crops, on-board cameras are not effective in estimating crop height. However, the high-resolution and high-accuracy 3D LiDAR enables the effective capture of the entire crop shape. This method clusters the obtained data into rows based on the position of the clusters with respect to the robot. Once clustered into distinct rows, the data is analyzed to determine the points that are located at the highest level from the ground for each crop in every row in real-time. To compensate for windy conditions when crops may be moving, this method utilizes mean values of the height estimations from adjacent times in order to determine the final crop heights value. Additionally, with the large scanning range of the 3D LiDAR sensor (104), it is possible to estimate the heights of several rows to the left and right of the row being traversed at the same time.

B. Stalk Radius Monitoring

Several characteristics of sensors and crops may be considered to accurately estimate the stalk radius. The 3D LiDAR sensor (104) may have a minimum scanning range, which can limit collection of reliable data close to the sensor. Therefore, it may not always be effective to use to estimate the stalk radius. However, the LiDAR sensor (116) includes a shorter minimum scan range that is also used for navigation which can be utilized to collect the stalk data needed to estimate its radius. The LiDAR sensor (116) is also mounted lower on the Jackal than the 3D LiDAR sensor (104). This is an adequate vantage point to obtain stalk radius data as the stalk is typically free from clutter at the bottom of the crops and sturdier than at higher locations, which are more susceptible to wind disturbances. The other important crop characteristic to be dealt with is the thin nature of the crop stalk (e.g., typically on the order of 10-20 mm). The thinner the stalk radius is, the smaller number of scans are reflected by the stalks. This limited scan data can make it difficult to estimate the radius accurately. To overcome this issue, the stalk radius estimation scheme shown schematically in FIGS. 4A-4C and in Algorithm 1 (see, FIG. 9) may be utilized.

Algorithm 1 (see, FIG. 9) can be used to estimate the center Xk and radius Rk of the crop stalk. It uses a density-based spatial clustering of applications with noise (DBSCAN) technique, which is a clustering method. Laser scans at several timestamps tTn:T(n+1)−1 with a time period T are clustered by DBSCAN. With each cluster ($C_{t_{Tn:T(n+1)-1},j}$), the two farthest points based on their euclidean distance from each other (c1, j and c2, j), are identified. These are used as the end points of the major axis of an ellipse to fit the data to. From this fit, the center point ($x_{t_{Tn:T(n+1)-1},j}$), and radius ($r_{t_{Tn:T(n+1)-1},j}$) of the cluster are estimated. As the final step, all the center points ($x_{t_{Tn:T(n+1)-1},j}$) and corresponding radius estimates ($r_{t_{Tn:T(n+1)-1},j}$) that are computed in every period T are clustered and the final center position (Xk) and (ellipse major axis) radius estimate (Rk) of kth crop stalk are computed as the output of Algorithm 1 (see, FIG. 9). Additionally, P-AgBot (100) traverses rows on both sides of crops to observe the stalks on either side to increase the amount of data points used to estimate the radius. This strategy improves the performance of estimating the stalk radius when compared to when data is only obtained from one side of the stalk.

IV. SYSTEMS AND METHODS FOR PHYSICAL SAMPLING

A. End Effector Operation

The gripper (106) on the arm (110) is used to grasp the desired leaf for physical sampling and the nichrome wire end-effector (114) is capable of cleanly cutting the leaf from the stalk of the corn plant. The nichrome wire can be housed in a 3D-printed linkage and mounted to the shaft of the motor (112) with proper insulation. The microcontroller (118), which can be an Arduino Uno manufactured by Arduino LLC of Somerville, MA. The microcontroller (118) can be used to send a signal to a relay module for energizing the circuit intermittently, and also to control the angle of the motor (112). The serial communication between the microcontroller (118) and Jackal can be established through ROS. The nichrome wire can be connected directly to the 12V power supply rail of Jackal with a 0.5Ω power resistor in series to keep the current draw under the recommended 10A rating. The high resistivity of the nichrome wire makes it suitable for this application as it heats up rapidly when current is passed through the circuit, and it cools down equally rapidly upon removal of the power source. To execute a physical sampling operation, the arm (110) follows the trajectory required to maintain a correct pose for enabling the fingers of the gripper (106) to grasp the target leaf close to its petiole (where it connects to stalk). The relay is then triggered to energize the circuit and heat up the nichrome wire. Finally, the motor (112) is used to swing the wire and cut the leaf through localized heating. After completion of the sampling operation, the sliced leaf is manipulated again using the arm (110) and placed in a storage box (120).

B. Exemplary Leaf Detection Based on Vision-Guidance

A leaf detection algorithm can be deployed for vision-guided leaf sampling. The end-effector (114) is guided by this algorithm using image processing techniques and positioned accordingly for the gripper (106) to grasp the detected leaf. It uses the wrist-mounted RGB-D camera (108) to detect the crop leaves using OpenCV in real time to extract the positional information. The RGB-D camera (108) is oriented such that the end-effector (114) components are not in its field of vision. Some image preprocessing is performed in the RGB frame to improve the performance of this algorithm and the data from the depth frame is utilized simultaneously to increase robustness. The steps for the leaf detection routine are shown in FIGS. 5A-4F and described below.

i. Image Filtering

The RGB stream from the RGB-D camera (108) is used as the input frame (see, FIG. 5A). A Gaussian filter is added for de-noising. The frame is transformed to HSV (hue, saturation, and value) color space so that only the details of the object of interest are preserved (see, FIG. 5B). The filtering parameters are selected while accounting for the color properties of the leaves and lighting conditions of the environment (see, FIG. 5C). This HSV thresholding method ensures the segmentation of leaves and removal of the background clutter. This segmented image (see, FIG. 5D) is then used to perform Canny edge detection. The removal of background by the HSV thresholding mask in the previous step aids in the process of edge detection (see, FIG. 5E).

ii. Contour Detection

The contours of each detected leaf are extracted in this step. They replicate the outlines of the leaves generated by the canny edge detector, but this step provides more flexibility by storing the shape, area, and position of the individual contours. The de-noising step in the preprocessing stage is unable to filter out all of the image noise or imperfections caused by lens flare. Therefore, the unwanted contours detected due to the presence of residual noise are removed by applying a thresholding filter based on minimum contour area. After completion of this step, the generated contours represent each of the detected leaves, respectively. The contour information is stored in the form of an indexed array, thus allowing the extraction of information correlating to a particular leaf. Additionally, the centers of the contours and their associated distance from the camera are calculated by combining the detection results with the depth frame. Their coordinates are stored as the output of this routine (see, FIG. 5F).

iii. End Effector Localization

The coordinates of the centers of the contours (X, Y, Z) are stored with respect to the image frame which is then aligned to the global frame. The X axis is coming out of plane in front of the camera, Y axis is to the left of the camera, and the Z axis is above the camera. The X distance is calculated directly from the depth frame of the RGB-D camera (108), while the Y and Z distances are approximated from the center point of the image frame with the help of camera calibration at each known depth value. Since the position of the RGB-D camera (108) is known relative to the end-effector (114), the transformed coordinates (X', Y', Z') are calculated in the final step. These coordinates are relayed to the arm using the Kinova Kortex API in the Cartesian frame which localizes the end-effector (114) to a position which enables grasping of the leaf.

C. Exemplary Leaf Detection Based on Deep Learning

Deep learning-based approaches may also be utilized for detecting and segmenting crop leaves for robotic physical sampling. Described is a method for gathering a physical dataset of agricultural crops such as corn and sorghum during the growing season, augmenting and labeling the data, and training Convolutional Neural Networks (CNNs). The depth frame of the RGB-D (108) camera can be incorporated in the pipeline along with RGB images to train Mask R-CNN and YOLOv5 models and estimate the position of detected leaves that is required for robotic physical sampling.

To that end, shown in FIG. 6 is an alternative method (300) for leaf detection which can additionally built onto the P-AgBot (100) robot platform for monitoring crop health and performing physical sampling of crop leaves. The method (300) primarily uses the RGB-D camera (108) to perform leaf detection and position estimation. The camera (108) is mounted to the wrist of the robotic arm (110) with a custom-designed nichrome wire end-effector linkage used for physical sampling. The camera (108) and depth frames are used as the input for the Mask R-CNN model which output the mask and bounding boxes of the detected leaves.

The camera calibration and depth values from the sensor are utilized to estimate the position of the leaves relative to the base of the robotic arm (110). Cutting the leaf close to the stalk is desirable for maximizing the sampling area. Therefore, the position of the leaf collar (i.e., where the leaf separates from the stalk) is predicted using a YOLOv5 neural network to aid the robotic physical sampling process. The X, Y, Z coordinates of the leaf predicted by the RGB-D camera (108) and neural networks are communicated to the arm (110) using the Kinova Cortex API to mobilize the end-effector (114) to the desired position for physically sampling the leaf.

i. Dataset Generation

The corn fields at the Agronomy Center for Research and Education (ACRE) at Purdue University were used for the data collection process. During the crop growing season of summer 2022, 1000+ images of corn leaves along with depth maps were generated with the help of the RGB-D camera (108). The data collection started when the plants were in stage V15 (approximately 4-feet tall) and ended when they reached full maturity in stage R6 (approximately 6-feet tall). The obtained images were depth-aligned using the Intel RealSense SDK, effectively making the RGB frame and depth frame fully conform to each other when superimposed. Additionally, more images of corn plants at stage V14 and mature sorghum plants from the Purdue greenhouse were added to expand the dataset. This example dataset ensures that the leaf detection system is functional for both outdoor fields as well as indoor crops.

This dataset was further augmented using techniques such as cropping, tilting, changing exposure, and adding Gaussian blur to simulate different environmental conditions and improve the robustness of the leaf detection algorithm, as shown in FIGS. 7A-7D. Cropping the image allows the leaf to appear zoomed-in, thus replicating scenarios where the leaf would be closer to the RGB-D camera (108). Zooming-in also helps remove unwanted clutter and peripheral leaves that are not suitable candidates for physical sampling, which optimizes training the networks. Tilting or rotating the images (between ±45 degrees), on the other hand, ensures that the network is trained on all possible orientation angles of the leaf with respect to the plant, as the leaves have a natural tendency to align themselves top-to-bottom and hang straight down vertically from the plant. Adjusting the exposure of the images (e.g., between ±0.5 exposure value) simulates the varying amount of sunlight available during the leaf detection process. Simultaneously, the underexposed versions of the images account for the extreme cases of direct sunlight hitting the image sensor and producing an overall darker image. Finally, a small amount of blur is added to some images using a Gaussian kernel of size (1, 1). This addition of Gaussian blur simulates high-wind scenarios during physical sampling causing the leaves to be swaying around or low-light scenarios when the camera has to lower the shutter speed to capture a well-exposed image but sacrifices image stabilization.

ii. Crop Detection Algorithm

The ACRE and Greenhouse dataset was used to hand label all the candidate leaves and leaf collars in the images using the VGG annotator tool into the two classes, respectively. The Mask R-CNN network was implemented to primarily detect and segment leaves while the YOLOv5 model was used for detecting leaf collars. The inclusion of a depth layer as an additional input for Mask R-CNN was shown to improve the instance segmentation accuracy by up to 31%. The precision of Mask R-CNN also improved with an RGB-D fusion input for object detection in industrial scenes. Therefore, the depth frame previously aligned with the RGB frame was concatenated into a single image to form a multi-channel input (3 channels representing RGB and 1 channel for depth). The Mask R-CNN network was modified for the 4-channel input and the image-label pairs were split into 80 percent for training and 20 percent for validation.

a. Leaf Boundary Detection and Segmentation

The Mask R-CNN implementation based on the ResNet backbone was performed mostly according to the original paper with TensorFlow. The pipeline was modified to include the depth-combined RGB input for training and feature extraction. This network trained on the ACRE and Greenhouse dataset is capable of detecting and segmenting leaves. This outputs the object class, the boundary of the detected region, and the bounding box of each of the detected leaves in the image. Since this is also an instance segmentation-based network, re-occurring objects from the same class are treated as a separate entity, thus allowing them to be uniquely colored as well as have separate bounding boxes. Moreover, the depth frame was used for extracting the distance of the detected points of interest from the camera, such as the bounding box edges. The depth frame was also calibrated to transform the pixel coordinates to global coordinates as a function of depth.

b. Leaf Collar Detection

The YOLOv5 is a much lighter model than Mask R-CNN as it does not use an additional network for predicting the region of interest, and hence it is less computationally demanding than the Mask R-CNN. A pure RGB image was used as the input for the YOLOv5 network and a bounding box was expected as the output.

The collar of a leaf in a corn or sorghum plant is a patchy band-like structure which marks the separation of a leaf from the stalk. It is generally colored one shade lighter than the shade of the leaf and is a distinguishable feature. The importance of the leaf collar detection network is two-fold since it aids in both the leaf detection and physical sampling pipeline by identifying the point at which the leaf attaches to the stalk. If the sampling is performed at that particular point using the nichrome wire end-effector (114), it will ensure that the whole leaf is cut instead of a small portion. A whole leaf is more desirable than a partial leaf for post-disease identification processes. Additionally, the detected leaf collar can be used as a fail-safe if the leaf boundaries cannot be detected due to severe occlusions. Once the leaf collar bounding box is detected, the center point of the box and its corresponding depth value is used to compute the XYZ coordinate of the leaf collar.

iii. Leaf Grasping for Robotic Physical Sampling

The deep learning-based approach for leaf grasping for robotic physical sampling uses the combined predictions from the Mask R-CNN and YOLOv5 neural networks trained on the ACRE and Greenhouse dataset for leaf and collar detection to guide the nichrome wire end-effector (114) and produce clean cuts in the leaves. The bounding boxes of the leaf collars and the masks generated by the neural networks are the primary inputs of our proposed physical sampling algorithm. The schematic of this physical sampling algorithm has been shown in FIG. 8. For a successfully detected leaf collar pair, the coordinates of the bounding box of the leaf collar are denoted by $(C_i, C_j, C_k, C_l)$ starting at the top left corner and moving clockwise. The extreme end points of the leaf masks are denoted by $(L_i, L_j)$ from left to right. The distance between the end points of the leaf from the bounding box of the leaf collar is calculated by obtaining the difference between the values of $L_i$, $L_j$ from $C_i$ . . . $C_l$, respectively. The smallest value obtained represents a straight line connecting the nearest edges of the leaf and collar, and the distance between them. The midpoint P of this line is chosen as the point for grasping the leaf as it ensures maximizing the sampling area of the leaf as well as prevents the risk of collision with the stalk by avoiding sampling too close to it. The depth value at this coordinate location is obtained from the RGB-D depth frame. Additionally, the slope of the line provides the orientation of the leaf locally relative to the stalk, denoted by θ. The camera calibration is then used to transform, the pixel coordinates values to global coordinates recognizable by the arm (110). The computed coordinates of point P are communicated through the Kinova Cortex API to localize the end-effector (114) of the arm (110) to the desired pose for performing physical leaf sampling guided by deep learning.

V. CONCLUSION

Accordingly, P-AgBot (100), an improved agricultural robot platform for crop sampling and monitoring is presented. The described robotic system operates in rows and under crop canopies. With the novel autonomous navigation system, P-AgBot (100) can traverse in narrow rows where GNSS signals cannot be utilized. The autonomous navigation results showed slight differences between the nominal target trajectories, but the small errors did not significantly affect crop safety. Rather, the damage to hanging leaves is minimized with our proposed scheme. The height estimation scheme performed effectively to estimate the crop heights in multiple rows simultaneously. Furthermore, despite the lack of stalk scan data due to the thin nature of corn stalks, this method was able to accurately estimate the stalk diameters. P-AgBot (100) has also been demonstrated to be able to autonomously physically sample a crop of interest using its vision-guided control framework.

Reference systems that may be used herein can refer generally to various directions (for example, upper, lower, forward and rearward), which are merely offered to assist the reader in understanding the various embodiments of the disclosure and are not to be interpreted as limiting. Other reference systems may be used to describe various embodiments, such as those where directions are referenced to the portions of the device, for example, toward or away from a particular element, or in relations to the structure generally (for example, inwardly or outwardly).

While examples, one or more representative embodiments and specific forms of the disclosure have been illustrated and described in detail in the drawings and foregoing description, the same is to be considered as illustrative and not restrictive or limiting. The description of particular features in one embodiment does not imply that those particular features are necessarily limited to that one embodiment. Some or all of the features of one embodiment can be used in combination with some or all of the features of other embodiments as would be understood by one of ordinary skill in the art, whether or not explicitly described as such. One or more exemplary embodiments have been shown and described, and all changes and modifications that come within the spirit of the disclosure are desired to be protected.

We claim:

1. A robotic system operable to navigate a terrain adjacent one or more agricultural crops, comprising:
   a) a movable body operable to navigate a ground terrain adjacent one or more agricultural crops;
   b) a tracking camera configured to generate visual-inertial odometry (VIO) data while the movable body navigates the ground terrain;
   c) a first LiDAR sensor configured to capture a first set of LiDAR data;
   d) a second LiDAR sensor configured to capture a second set of LiDAR data;
   e) a controller configured to:
      i) generate terrain navigation instructions utilizing a Monte Carlo Localization algorithm, wherein the Monte Carlo Localization algorithm includes the VIO data from the tracking camera and the first set of LiDAR data; and
      ii) generate a crop monitoring dataset including at least one of a crop stalk height or a crop stalk radius using at least one of first LiDAR data from the first LiDAR sensor and the second set of LiDAR data from the second LiDAR sensor;
   wherein the Monte Carlo Localization algorithm of the controller incorporates an Extended Kalman Filter (EKF) to generate the terrain navigation instructions;
   wherein the movable body is coupled with a plurality of wheels configured to navigate the ground terrain, wherein the plurality of wheels defines a wheel odometry while the movable body navigates the ground terrain adjacent one or more agricultural crops, wherein the EKF is configured to combine the wheel odometry and the VIO data.

2. The robotic system of claim 1, further comprising:
   a) a gripping member selectively operable to grasp one or more of the agricultural crops; and
   b) an end effector selectively operable to cut and remove a portion from one or more of the agricultural crops.

3. The robotic system of claim 2, wherein the controller is further configured to initiate a crop sampling procedure by selectively controlling the gripping member and end effector, wherein the crop sampling procedure includes cutting and removing the portion from one or more of the agricultural crops.

4. The robotic system of claim 3, wherein the end effector includes a nichrome wire, wherein the controller is operable to heat the nichrome wire to cut the portion of the one or more of the agricultural crops during the crop sampling procedure.

5. The robotic system of claim 1, further comprising a robotic arm moveable about six degrees of freedom.

6. The robotic system of claim 5, further comprising:
   a) a gripping member selectively operable to grasp one or more of the agricultural crops; and
   b) an end effector selectively operable to cut and remove a portion from one or more of the agricultural crops;
   wherein the gripping member and the end effector are coupled with the robotic arm.

7. The robotic system of claim 6, further comprising an RGB-D camera mounted on the robotic arm, wherein the RGB-D camera is configured to provide vision-based guidance instructions to the robotic arm, wherein the vision-based guidance instructions includes at least one of a position and a distance of the robotic arm related to the portion of the one or more of the agricultural crops during the crop sampling procedure.

8. The robotic system of claim 1, wherein the first LiDAR sensor is a two-dimensional LiDAR sensor, wherein the second LiDAR sensor is a three-dimensional LiDAR sensor.

9. The robotic system of claim 1, wherein generating a crop monitoring dataset includes initiating a neural network algorithm to detect a portion of one or more of the agricultural crops.

10. A robotic system operable to navigate a terrain adjacent one or more agricultural crops, comprising:
   a) a movable body operable to navigate a ground terrain adjacent one or more agricultural crops;
   b) a tracking camera configured to generate visual-inertial odometry (VIO) data while the movable body navigates the ground terrain;
   c) a first LiDAR sensor configured to capture a first set of LiDAR data;
   d) a second LiDAR sensor configured to capture a second set of LiDAR data;
   e) a gripping member selectively operable to grasp one or more of the agricultural crops;
   f) an end effector selectively operable to cut and remove a portion from one or more of the agricultural crops; and
   g) a controller configured to:
      i) generate terrain navigation instructions utilizing a Monte Carlo Localization algorithm, wherein the Monte Carlo Localization algorithm includes the VIO data from the tracking camera and the first set of LiDAR data; and
      ii) initiate a crop sampling procedure by selectively controlling the gripping member and end effector, wherein the crop sampling procedure includes cutting and removing the portion from one or more of the agricultural crops;
   wherein the Monte Carlo Localization algorithm of the controller incorporates an Extended Kalman Filter (EKF) to generate the terrain navigation instructions;
   wherein the movable body is coupled with a plurality of wheels configured to navigate the ground terrain, wherein the plurality of wheels defines a wheel odometry while the movable body navigates the ground terrain adjacent one or more agricultural crops, wherein the EKF is configured to combine the wheel odometry and the VIO data.

11. The robotic system of claim 10, further comprising a robotic arm moveable about six degrees of freedom.

12. The robotic system of claim 11, wherein the gripping member and the end effector are coupled with the robotic arm.

13. The robotic system of claim 12, further comprising an RGB-D camera mounted on the robotic arm, wherein the RGB-D camera is configured to provide vision-based guidance instructions to the robotic arm, wherein the vision-based guidance instructions includes at least one of a position and a distance of the robotic arm related to the portion of the one or more of the agricultural crops during the crop sampling procedure.

14. The robotic system of claim 11, wherein the first LiDAR sensor is a two-dimensional LiDAR sensor, wherein the second LiDAR sensor is a three-dimensional LiDAR sensor.

15. A robotic system operable to navigate a terrain adjacent one or more agricultural crops, comprising:

a) a movable body operable to navigate a ground terrain adjacent one or more agricultural crops;

b) a first LiDAR sensor configured to capture a first set of LiDAR data, wherein the first set of LiDAR data includes a first three-dimensional LiDAR dataset;

c) a second LiDAR sensor configured to capture a second set of LiDAR data, wherein the second set of LiDAR data includes a second three-dimensional LiDAR dataset;

d) a robotic arm movable about six degrees of freedom, including:

i) a gripping member selectively operable to grasp one or more of the agricultural crops; and ii) an end effector selectively operable to cut and remove a portion from one or more of the agricultural crops; and e) a controller configured to:

i) generate terrain navigation instructions utilizing a Monte Carlo Localization algorithm, wherein the Monte Carlo Localization algorithm includes the VIO data from the tracking camera and the first set of LiDAR data; and ii) initiate a crop sampling procedure by selectively controlling the gripping member and end effector, wherein the crop sampling procedure includes cutting and removing the portion from one or more of the agricultural crops;

wherein the Monte Carlo Localization algorithm of the controller incorporates an Extended Kalman Filter (EKF) to generate the terrain navigation instructions;

wherein the movable body is coupled with a plurality of wheels configured to navigate the ground terrain, wherein the plurality of wheels defines a wheel odometry while the movable body navigates the ground terrain adjacent one or more agricultural crops, wherein the EKF is configured to combine the wheel odometry and the VIO data.

16. The robotic system of claim 15, further comprising a robotic arm moveable about six degrees of freedom.

17. The robotic system of claim 16, further comprising:

a) a gripping member selectively operable to grasp one or more of the agricultural crops; and b) an end effector selectively operable to cut and remove a portion from one or more of the agricultural crops;

wherein the gripping member and the end effector are coupled with the robotic arm.

* * * * *